(12) United States Patent
Bauer et al.

(10) Patent No.: US 11,624,890 B2
(45) Date of Patent: Apr. 11, 2023

(54) METHOD FOR PRODUCING A CAMERA MODULE

(71) Applicant: Robert Bosch GmbH, Stuttgart (DE)

(72) Inventors: Nikolai Bauer, Moeglingen (DE); Andreas Moehrle, Kornwestheim (DE); Moritz Winkler, Waldbronn (DE); Michael Gockel, Nesselwang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/743,694

(22) Filed: May 13, 2022

(65) Prior Publication Data

US 2022/0269031 A1    Aug. 25, 2022

Related U.S. Application Data

(62) Division of application No. 17/014,415, filed on Sep. 8, 2020, now Pat. No. 11,366,279.

(30) Foreign Application Priority Data

Sep. 18, 2019 (DE) .................. DE102019214206.0
Mar. 4, 2020 (DE) .................. DE102020202784.6

(51) Int. Cl.
- *G02B 7/02* (2021.01)
- *G03B 17/12* (2021.01)
- *H04N 23/54* (2023.01)
- *H04N 23/55* (2023.01)

(52) U.S. Cl.
CPC ............ *G02B 7/021* (2013.01); *G03B 17/12* (2013.01); *H04N 23/54* (2023.01); *H04N 23/55* (2023.01)

(58) Field of Classification Search
USPC .................................. 396/535, 542; 438/69
See application file for complete search history.

(56) References Cited

U.S. PATENT DOCUMENTS

| 6,616,480 B2 * | 9/2003 | Kameyama .......... H01R 13/521 439/271 |
| 11,366,279 B2 * | 6/2022 | Bauer ................... H04N 23/54 |
| 2016/0133762 A1 * | 5/2016 | Blasco Claret ... H01L 27/14625 438/69 |

FOREIGN PATENT DOCUMENTS

| CN | 105763780 A | 7/2016 |
| DE | 102008013921 A1 | 9/2009 |
| DE | 102018202424 A1 | 8/2019 |
| EP | 3280127 A1 | 2/2018 |

* cited by examiner

*Primary Examiner* — Clayton E. La Balle
*Assistant Examiner* — Warren K Fenwick
(74) *Attorney, Agent, or Firm* — Norton Rose Fulbright US LLP; Gerard Messina

(57) ABSTRACT

A method for joining a camera module, which includes a base plate on which an image sensor is situated, and an objective holder in which an objective of the camera module is accommodated. The base plate and the objective holder are aligned relative to each other in a connection region and a connecting pin is guided through a recess of the base plate and/or the objective holder so that the connecting pin protrudes on the outside, and the at least one free end of the connecting pin is widened by a forming die using a radially acting deformation force such that the base plate and the objective holder are pressed against each other.

7 Claims, 9 Drawing Sheets

FIG. 6
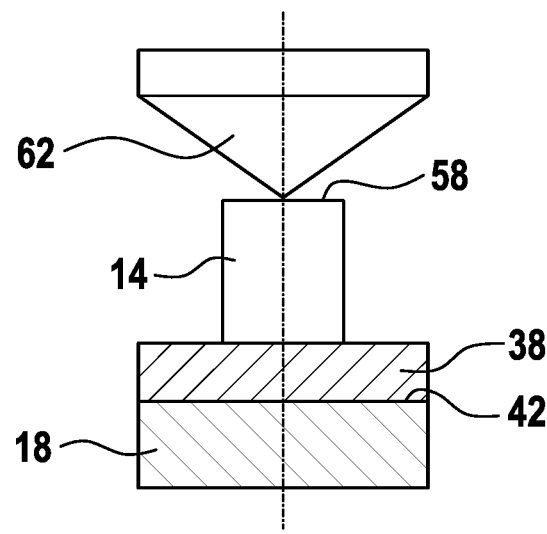
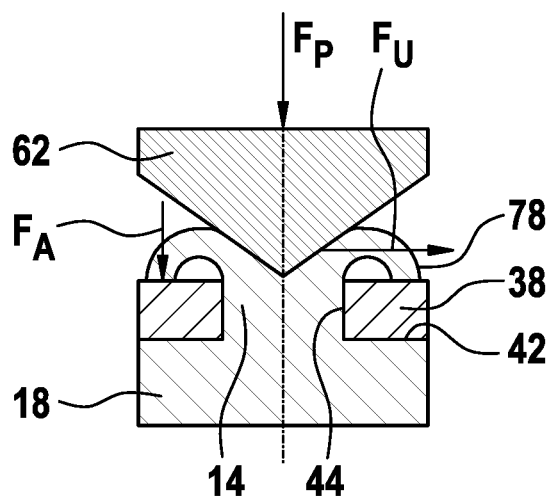
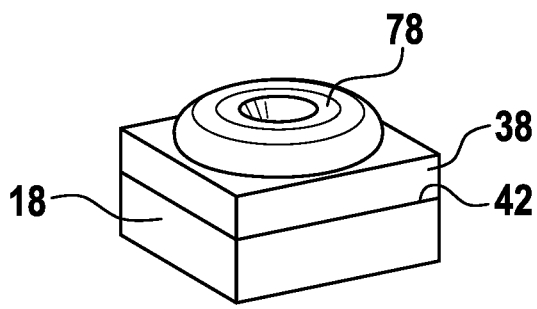

FIG. 7
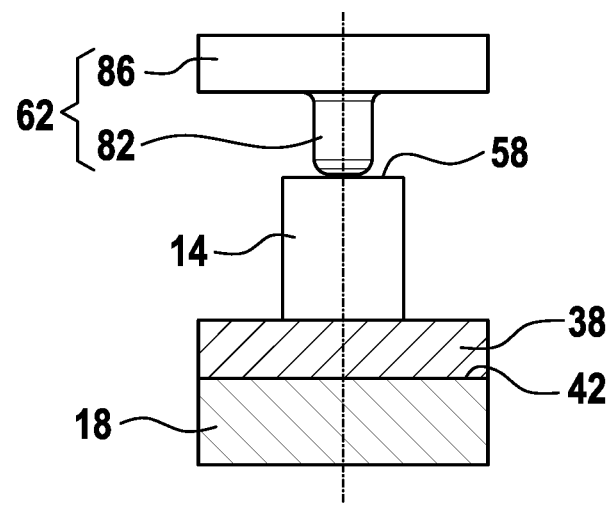
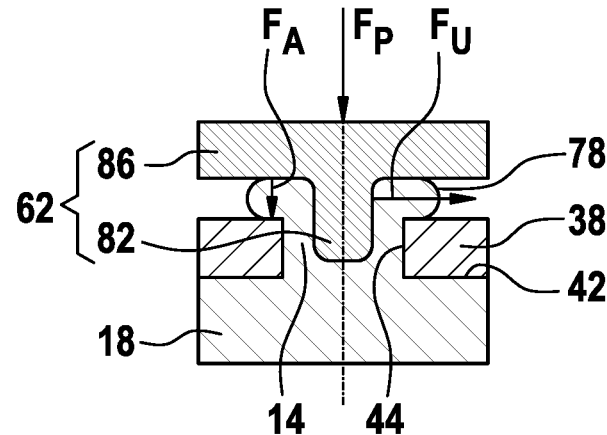
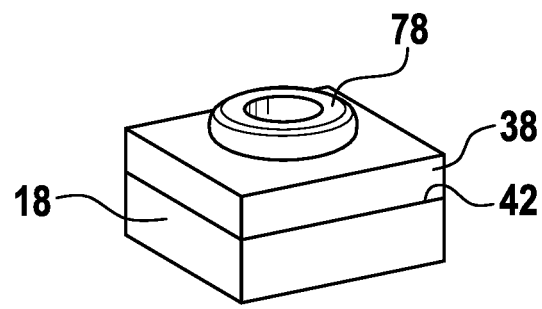

FIG. 8
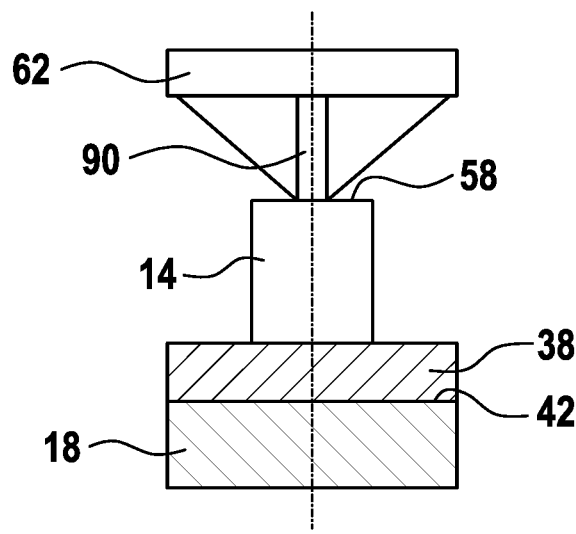
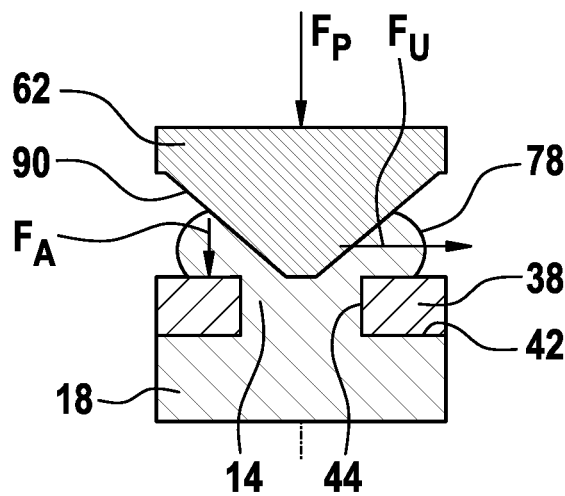
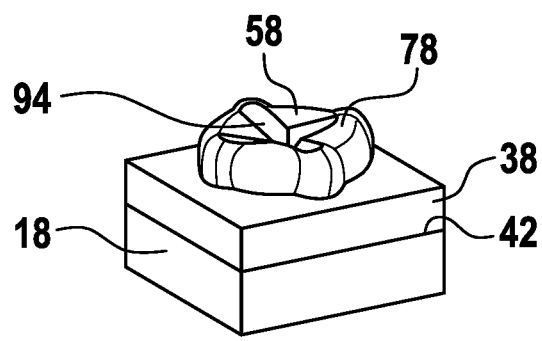

FIG. 9
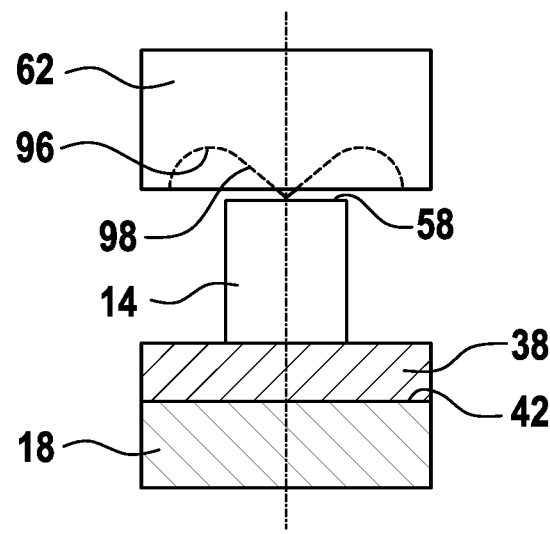
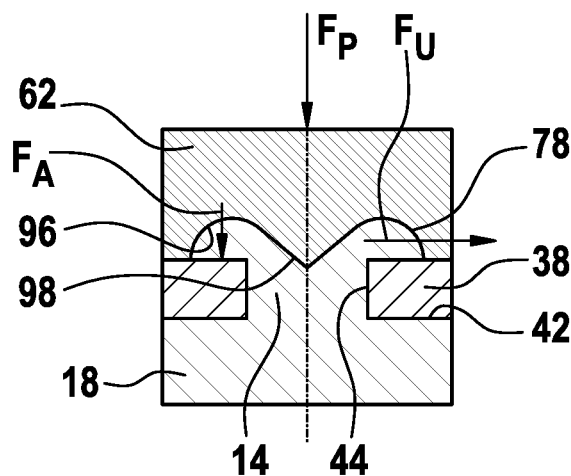
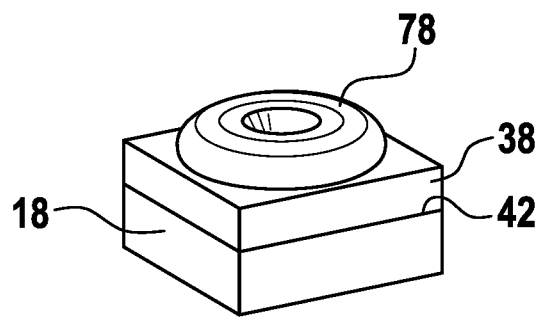

METHOD FOR PRODUCING A CAMERA MODULE

CROSS REFERENCE

The present application is a divisional application of U.S. application Ser. No. 17/014,415 filed Sep. 8, 2020, which claims the benefit under 35 U.S.C. § 119 of German Patent Application No. DE 102019214206.0 filed on Sep. 18, 2019, and German Patent Application No. DE 102020202784.6 filed on Mar. 4, 2020, which are all expressly incorporated herein by reference in their entireties.

FIELD

The present invention relates to a camera module and to a method for producing such a camera module.

BACKGROUND INFORMATION

In camera modules, the interface between the circuit board of the image sensor and the objective holder/housing is frequently connected by bonding, screwing or caulking. Sometimes methods such as welding or soldering are used as well in order to produce a substance-to-substance bond.

European Patent No. EP 3,280,127 A1 describes a camera system for measuring applications, which has an objective carrier and an image sensor situated on the circuit board. The circuit board can be connected to the objective holder using different fasteners. For example, screwed, riveted or bolted connections are described in this case. In the same way, the circuit board and the objective holder can be connected to each other via a welded, soldered or a bonded connection.

SUMMARY

An object of the present invention it to produce a space-saving connection between the circuit board and the objective holder/housing that provides excellent thermal conduction and holding properties. This objective may be achieved in accordance with example embodiments of the present invention. Preferred embodiments of the present invention are described herein.

The present invention provides a method for joining/assembling a camera module, which includes a base plate on which an image sensor is situated, and an objective holder in which an objective of the camera module is accommodated, the base plate and the objective holder being aligned relative to each other in a connection region, and a connecting pin being guided through a recess of the base plate and/or the objective holder so that the connecting pin protrudes on the outside. The at least one free end of the connecting pin is widened by a forming die using a radially acting deformation force such that the base plate and the objective holder are pressed against each other.

A connecting pin is understood as a pin-shaped element, which extends through a corresponding recess of the base plate or the objective holder, which is preferably developed as a bore. The connecting pin projects beyond an outer side of the component through whose recess the connecting pin passes.

The connecting pin is able to be developed as a separate component, which extends through a corresponding recess of the base plate and the objective holder. The connecting pin would therefore have two free ends. In the same way, however, the connecting pin may also be formed directly by the objective holder or the base plate or be fixedly connected to it so that the connecting element has only one free end.

A plastic change in shape of the free end, which consists of widening this end, is brought about with the aid of the forming die. The free end is widened in such a way that the outer dimensions of the free end are larger than the outer dimensions of the recess. This causes the base plate and/or the objective holder to be pushed in a direction counter to the free end toward the center of the connecting pin. An axial holding force is correspondingly produced, which presses the base plate and the objective holder against each other.

The widening fills a gap between the connecting pin and the recess so that a positive connection is produced with the aid of the connecting pin. An axial contact pressure is thus applied in a connection region in which the base plate and the objective holder rest against each other.

In comparison with welding, for example, such a connection between the base plate and the objective holder is able to be produced faster and more economically. Moreover, no additional screw-in depth for the required thread length has to be provided as needs to be done in the case of a screwed connection. The wall thickness of the base plate and/or the objective holder may be correspondingly reduced. Such a camera module may therefore have a smaller design, which translates into space savings. This is advantageous in particular because of the tight installation situation of such a camera module.

The advantage of conventional caulking over a rivet head is that there is no need to bridge the base plate to allow for pretensioning of the base plate and the objective holder. This avoids potential damage to the image sensor. In addition, such a connection requires less space so that more surface is available on the circuit board for electrical components/layout.

In contrast to a bonded connection, a bonding layer between the base plate and the objective holder is not required either. Such a bonding layer reduces the thermal conduction between the base plate and the objective holder. In contrast, the base plate and the objective holder have direct planar contact with each other according to the present invention so that the thermal conduction is considerably improved. By connecting the base plate and the objective holder with the aid of the connecting pin, a space-optimized camera module is produced, which offers high stability and excellent thermal conduction.

In one preferred embodiment of the present invention, prior to the joining, the connecting pin is developed as a positioning pin of the objective holder or the base plate. The connecting pin is thus permanently provided so that no additional joining parts are necessary. In addition, an exact positioning of the base plate and the objective holder is able to take place via the connecting pin. The connecting pin thus has multiple functions so that corresponding positioning means or elements are able to be dispensed with.

In a further preferred embodiment of the present invention, the connecting pin is hollowed out on the inside at the free end prior to the widening. 'Hollowed out' means that only a desired wall thickness of an outer edge remains in the region of the free end. In a cylindrical connecting pin, such a cavity is preferably produced by a bore so that a hollow-cylindrical region is formed at the free end.

The hollowing out has the advantage that a corresponding widening is able to be produced using a smaller pressure force of the forming die. This avoids damage to the components. In addition, such a widening is thereby easier to produce.

Prior to the widening of the connecting pin, an inner bead is formed in the hollowed-out free end of the connecting pin so that an outer bead is developed by the widening. An inner bead in the sense of the present invention is understood as a thickening that is situated in the hollowed-out free end and extends inwardly toward a center of the connecting pin. The inner bead is raised in relation to the core diameter. The inner bead is preferably situated at the level of an outer side of the element to be fastened. Accordingly, an outer bead is a thickening which protrudes in an external region of the connecting pin. This inner bead/ring segment is able to be produced by introducing a bore from the oppositely situated side of the objective holder.

By introducing the forming die into the region of the hollowed-out free end, a greater radial deformation force is generated in the region of the inner bead, which means that the material in this region is more heavily pushed in the outward direction in comparison with the rest of the widened region. An outer bead at the level of the component to be fastened is formed in a corresponding manner. The thereby developing position of the outer bead is consequently able to be specified by the positioning of the inner bead. This improves the attachment of the base plate to the lens carrier.

The connecting pin is advantageously widened at the free end with the aid of a conical forming die. A conical forming die is understood as a tool that is conical at least in a frontmost region which acts on the free end. The forming die may be developed as a conical die or as a die in the shape of a truncated cone. Because of the conical shape of the forming die, the free end is able to be steadily widened. Moreover, the press force is reduced.

In one preferred further development of the present invention, the conical forming die has an obtuse angle so that apart from a radial widening deformation force, an axial force is additionally applied to the base plate via the connecting pin, which improves the attachment of the base plate to the objective holder.

In an advantageous further development of the present invention, to widen the connecting pin via the forming die, a conical insertion element is mounted on the free end of the connecting pin, which remains in the free end of the connecting pin after the widening. The connecting pin is both widened and the widening is protected from returning to its original shape because of the insertion element, which is permanently provided in the free end after the widening. The widening is consequently able to be provided on a permanent basis. The surface of this insertion element could be developed in such a way that the surface has a defined profile, e.g., has grooves or a defined roughness. Thus, the insertion element is additionally connected in a positive manner.

According to an alternative embodiment of the present invention, the connecting pin is widened at the free end with the aid of a cylindrical forming die. The part of the cylindrical forming die that penetrates the free end of the connecting pin has a smaller diameter and a shorter length than the connecting pin. In addition, this part is fastened to a region whose outer dimensions are considerably greater than the diameter of the connecting pin. Because of the widening, this region is additionally able to be deformed such that the connecting pin exerts an axial force on the base plate, which fastens it in place. The free end may thus be widened and an axial force be simultaneously applied in the same working step.

According to another advantageous exemplary embodiment of the present invention, the connecting pin is widened at the free end by a forming die provided with a segmented outer contour. The outer contour is thus not developed as a body that forms the entire outer contour. Instead, the forming die has an outer contour that is made up of a number of segments. The forming die therefore does not possess this outer contour between adjacent segments. The segments advantageously extend radially from a center and in the outward direction. Four segments are preferably provided, which are disposed in the pattern of a cross.

Such a segmented outer contour offers the advantage that material is able to be saved on account of the segment-shaped development of the forming die. In addition, the base plate is subjected to an axial force via the connecting pin in essence in the regions in which the forming die is provided with segments. This makes it possible to reduce the axial force of the base plate. The deformation force of the forming die is lower as well. Moreover, excess material is able to be pushed into the region between the segments.

The connecting pin is advantageously widened at the free end by a forming die having a deflection contour. The deflection contour forms a negative form of the developed end of the connecting pin after the deformation. The deflection contour includes at least one part for widening the connecting pin. This part preferably has a conical development. In the same way, this part may have a cylindrical development or be developed with segments. Through the deflection contour, the free end is able to be given a defined development. Because of the developed shape of the free end, the axial force is adaptable.

In addition, the present invention provides a camera module which is produced according to the present method. The camera module includes a base plate on which an image sensor is situated, and an objective holder in which an objective of the camera module is accommodated. In addition, the camera module includes a connecting pin, which extends through the base plate and/or the objective holder in a connection region, the at least one free end of the connecting pin being radially widened so that the base plate and the objective holder are pressed against each other. Such a camera module offers the above-described advantages.

In one advantageous embodiment of the present invention, the free end of the connecting pin has a conical outer contour. Via the conical outer contour, a uniform axial holding force is able to be applied in a recess, preferably developed in the form of a bore.

According to a useful embodiment of the present invention, an insertion element is situated in the widened free end of the connecting pin. The insertion element is preferably developed from a metallic material or from plastic. The use of such an insertion elements achieves the above-described advantages.

The free end of the connecting pin preferably has a toroidal outer contour, which rests on the base plate on the face side.

The toroidal outer contour has an outer diameter which is greater than the recess of the base plate through which the connecting pin protrudes. As a result, the base plate is simultaneously fixed in place via the connecting pin. In addition, the toroidal outer contour exerts an axial force on the base plate by which better fastening is achievable.

In one advantageous further development of the present invention, the free end of the connecting pin is provided with a plurality of groove-type indentations. The groove-type indentations are preferably developed in the form of a cross so that the free end of the connecting pin has the cross-slotted contour.

In addition, the present invention also provides a camera system which includes such a camera module. Such a camera system may achieve the above-mentioned advantages.

Exemplary embodiments of the present invention are shown in the figures and described in greater detail below.

BRIEF DESCRIPTION OF THE DRAWINGS

FIG. 6 shows method steps for widening the connecting pins according to a fifth exemplary embodiment of the present invention.

FIG. 7 shows method steps for widening the connecting pins according to a sixth exemplary embodiment of the present invention.

FIG. 8 shows method steps for widening the connecting pins according to a seventh exemplary embodiment of the present invention.

FIG. 9 shows method steps for widening the connecting pins according to an eighth exemplary embodiment of the present invention.

DETAILED DESCRIPTION OF EXAMPLE EMBODIMENTS

Figure 1:
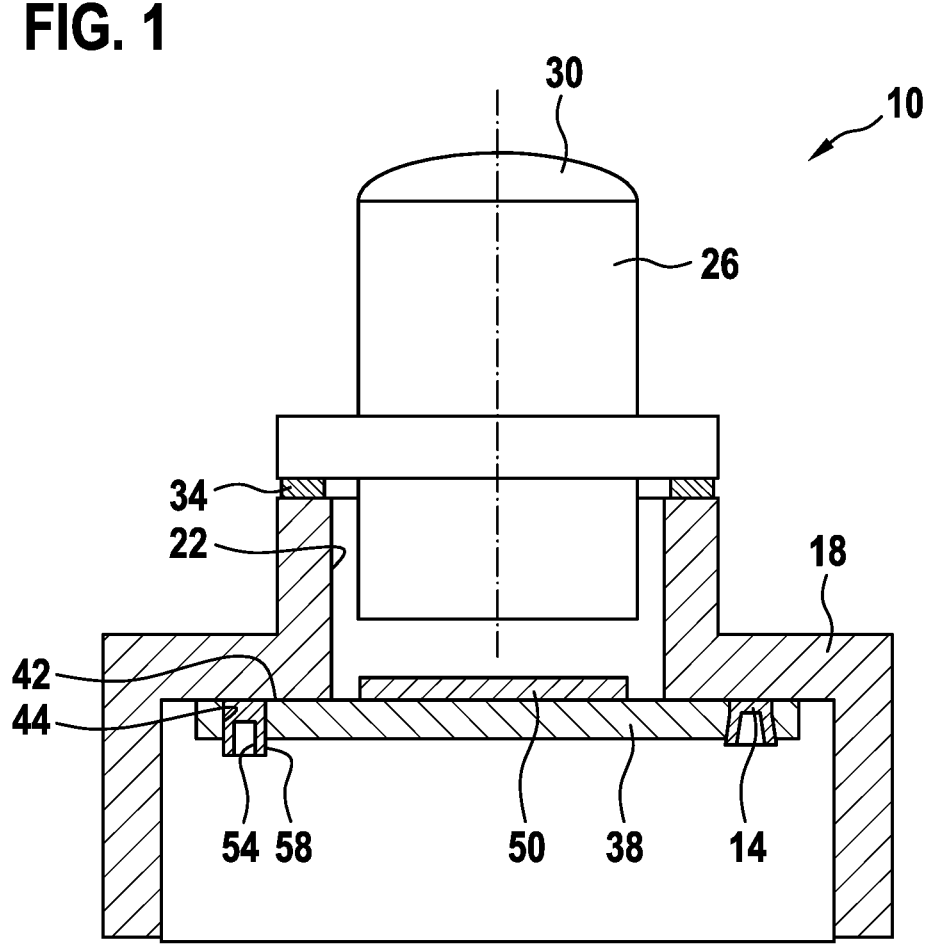
FIG. 1 shows a camera module having connecting pins according to a first exemplary embodiment of the present invention.

FIG. 1 shows a camera module 10 having connecting pins 14 according to a first exemplary embodiment. Camera module 10 includes an objective holder 18 in which an objective 26 having a lens 30 is accommodated in a cutout 22. Objective 26 is fastened to objective holder 18 with the aid of a bond 34, which is applied between objective holder 18 and objective 26.

Camera module 10 additionally includes a base plate 38, which rests against objective holder 18 in a connection region 42 in a planar manner. For the positioning of base plate 38 relative to objective holder 18, connecting pins 14 are developed as positioning pins of objective holder 18 in this exemplary embodiment. Connecting pins 14 engage with corresponding recesses 44 of base plate 38. An image sensor 50, which is connected to base plate 38, is situated on base plate 38. Image sensor 50 is disposed in alignment with objective 26.

In the exemplary embodiment shown in FIG. 1, connecting pins 14 are developed to be hollow on the inside by drilling them open so that a hollowed-out region 54 is created. In connecting pins 14 shown in this figure, a free end 58 of these connecting pins 14 protrudes beyond base plate 38. Free end 58 of connecting pin 14 shown on the right side of the camera module is additionally widened and has a conical outer contour. Via this outer contour, base plate 38 and objective holder 18 are pressed against each other. In contrast, free end 58 of connecting pin 14 on the left side of the camera module has not yet been widened so that base plate 38 is not sufficiently attached there.

Figure 2:
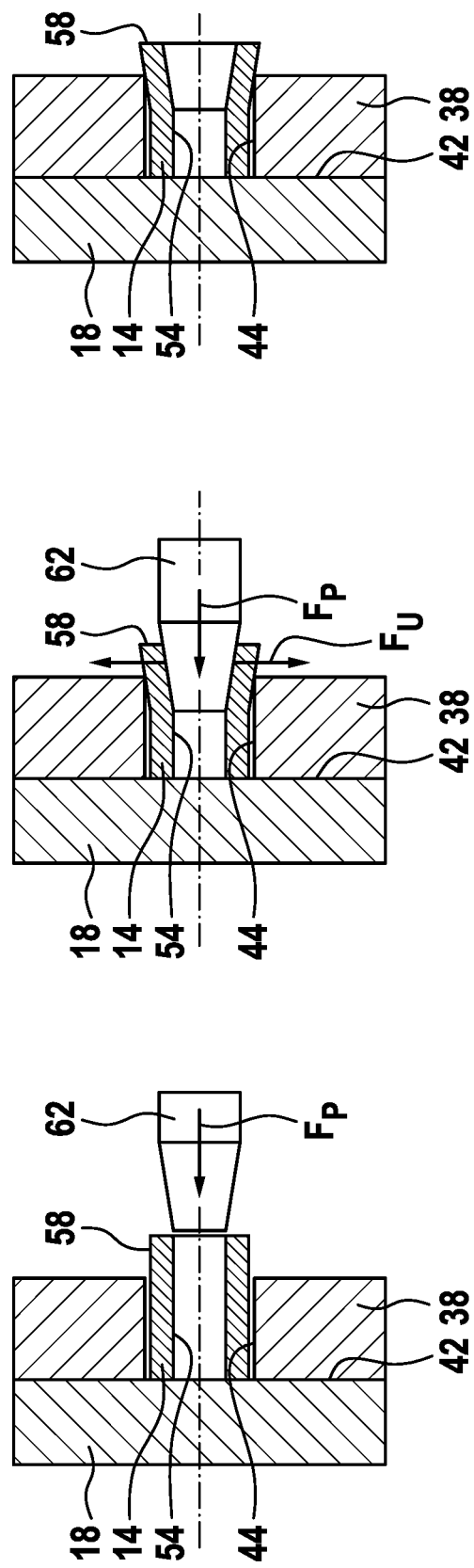
FIG. 2 shows method steps for widening the connecting pins according to the first exemplary embodiment of the present invention.

FIG. 2 shows, from left to right, the method steps for widening connecting pins 14 according to the first exemplary embodiment. For this purpose, after connecting pin 14 has been hollowed out and base plate 38 has been positioned on connecting pins 14 developed as positioning pins, a conically shaped forming die 62, which is developed in the form of a truncated cone in this instance, is applied to free end 58. This conical forming die 62 is then introduced into the hollowed-out region using a press force $F_P$ so that the free end is widened by a radially acting deformation force $F_U$ until sufficient contact pressure is present between base plate 38 and objective holder 18.

Figure 3:
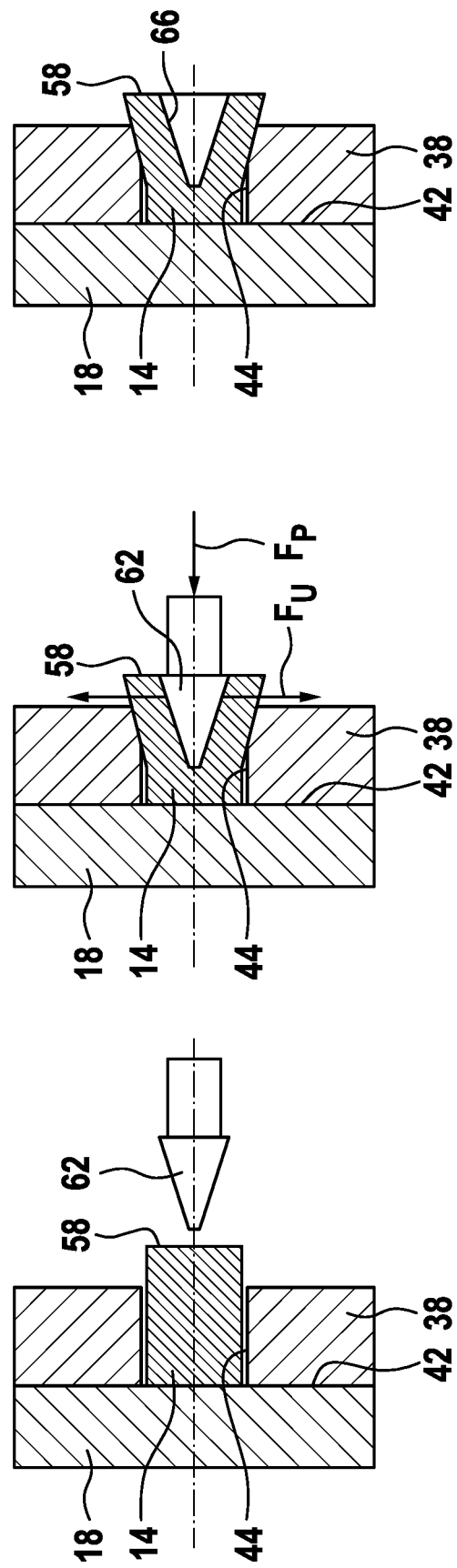
FIG. 3 shows method steps for widening the connecting pins according to a second exemplary embodiment of the present invention.

The method steps for widening connecting pins 14 according to a second exemplary embodiment are shown in FIG. 3. In contrast to the exemplary embodiment of FIG. 2, connecting pin 14 has not been hollowed out in advance. A conical forming die 62 is therefore applied to free end 58 of connecting pin 14 in the center in this exemplary embodiment. The material is widened via the applied press force $F_P$ so that an imprint 66 of forming die 62 is developed on the free end 58 of connecting pin 14. Here, too, forming die 62 is pressed onto connecting pin 14 until sufficient contact pressure has been established between base plate 38 and objective holder 18.

Figure 4:
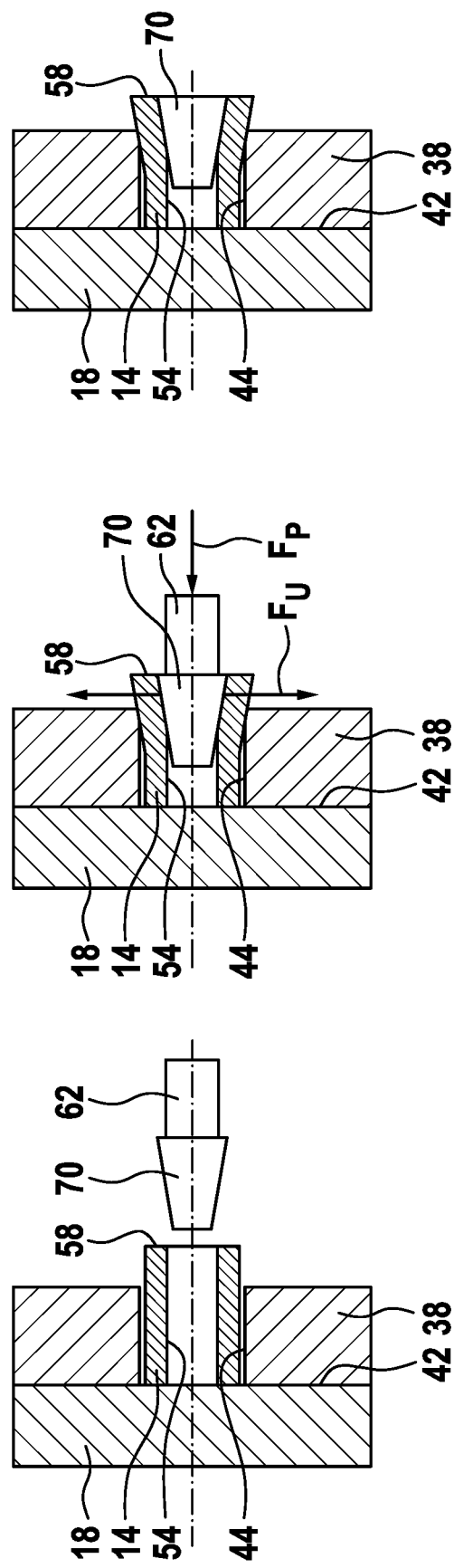
FIG. 4 shows method steps for widening the connecting pins according to a third exemplary embodiment of the present invention.

FIG. 4 shows the method steps for widening connecting pins 14 according to a third exemplary embodiment. This exemplary embodiment differs from the exemplary embodiment shown in FIG. 2 insofar as forming die 62 has a conical insertion element 70 by which connecting pin 14 is widened. However, after the widening, this insertion element 70 is not pulled out again together with forming die 62. Instead, insertion element 70 remains in connecting pin 14 and thereby ensures permanent widening.

Figure 5:
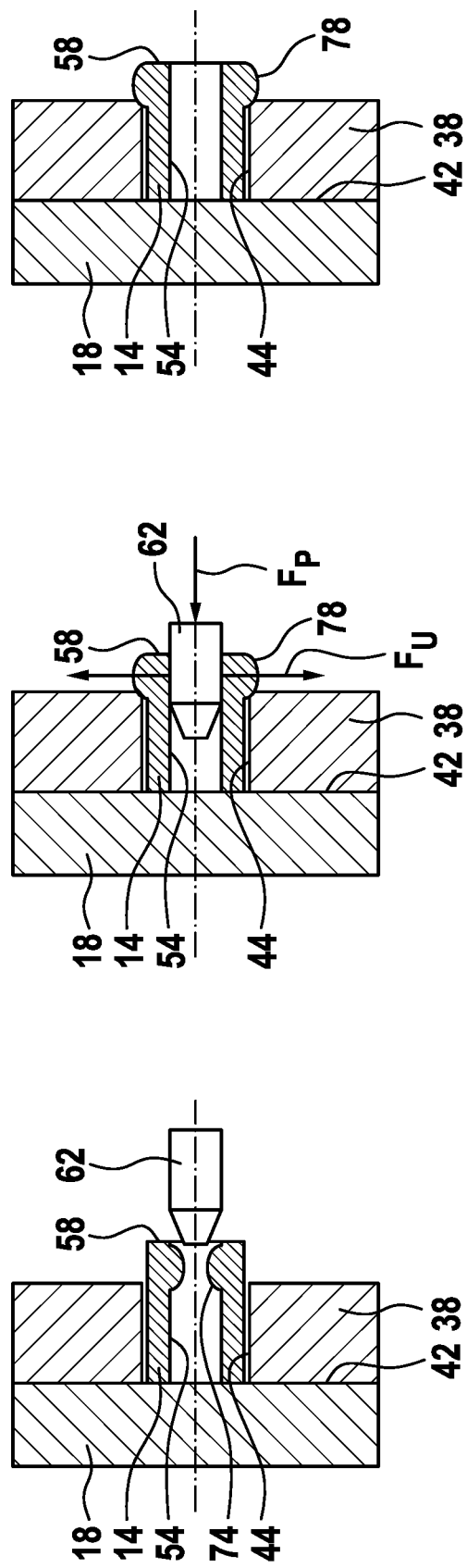
FIG. 5 shows method steps for widening the connecting pins according to a fourth exemplary embodiment of the present invention.

In FIG. 5, the method steps for widening connecting pins 14 are illustrated according to a fourth exemplary embodiment. In this exemplary embodiment, an inner bead 74 is developed in addition to hollowed-out region 54. This inner bead 74 is disposed in an axial region of connecting pin 14, which is at a level of an outer side of base plate 38. To form a widening, forming die 62 is introduced into hollowed-out region 54. Forming die 62 has a conical development only in a frontal region. The diameter of forming die 62 corresponds at most to the inner diameter of hollowed-out region 54 without inner bead 74. Because of the insertion of forming die 62 using press force $F_P$, inner bead 74 is pressed in the outward direction beyond base plate 38, which results in the creation of an outer bead 78. Via outer bead 78, base plate 38 is pressed against objective holder 18.

The method steps for widening connecting pins 14 according to a fifth exemplary embodiment are shown in FIG. 6. This exemplary embodiment differs from the exemplary embodiment shown in FIGS. 2 and 3 in that conical forming die 62 has an obtuse angle. Forming die 62 projects from connecting pin 14 on the outside. In this particular exemplary embodiment, connecting pin 14 may be developed from a solid material and also be hollow on the inside. Forming die 62 is applied to free end 58 so that it is widened. Because of the obtuse angle of forming die 62, free end 58 is additionally pressed against base plate 38 in an axial direction by an axial force $F_A$ so that a toroidal outer bead 78 is created, which rests against base plate 38 on the face side.

FIG. 7 illustrates the method steps for widening connecting pins 14 according to a sixth exemplary embodiment. In this exemplary embodiment as well, a connecting pin 14 may be made from a solid material and also be a connecting pin 14 which is hollow on the inside. In this particular exemplary embodiment, forming die 62 has a cylindrical shape. A first subregion 82 of forming die 62 has a smaller outer diameter than the adjoining second subregion 86. The outer diameter of first subregion 82 is smaller than a diameter of connecting pin 14 while the outer diameter of second subregion 86 is greater than connecting pin 14.

An axial length of first subregion 82 of forming die 62 is smaller than the length of connecting pin 14 so that during the deformation step, first subregion 82 of forming die 62 centrally penetrates free end 58 and causes it to widen. In addition, second subregion 86 rests against free end 58 of connecting pin 14 on the face side. This not only widens connecting pin 14 but also presses connecting pin 14 against base plate 38 with an axial force $F_A$, thereby forming a flat, toroidal outer contour is.

FIG. 8 shows method steps for widening connecting pins 14 according to a seventh exemplary embodiment. This exemplary embodiment differs from the exemplary embodiment illustrated in FIG. 6 in that forming die 62 has an outer contour in the form of a truncated cone, which is made up of a plurality of segments 90, segments 90 being positioned in the form of a cross. This outer contour also has an obtuse angle. During the deformation step, these segments 90 of forming die 62 are acting on free end 58 of connecting pin 14 so that it is both widened and axially pressed against base plate 38. Because of segments 90, free end 58 has groove-type indentations 94.

FIG. 9 illustrates method steps for widening connecting pins 14 according to an eighth exemplary embodiment. In this exemplary embodiment forming die 62 has a deflection contour 96 on the inside, which has an axially symmetrical development. Deflection contour 96 includes a conical part 98 in the center by which free end 58 is initially widened. Radially with respect to the edges of forming die 62, deflection contour 96 has a bow-shaped development so that the widened part of connecting pin 14 is deformed in accordance with this contour along the deflection contour in the direction of the edges of deflection contour 96.

As a consequence, free end 58 of connecting pin 14 is developed in the form of a toroidal outer contour in this exemplary embodiment, which exerts an axial force $F_A$ on base plate 38.

In one exemplary embodiment, which is not shown, conical part 98 may also be developed in the form of a cylinder or may include segments 90.

What is claimed is:

1. A camera module, comprising:
    a base plate on which an image sensor is situated;
    an objective holder in which an objective of the camera module is accommodated; and
    a connecting pin which extends through the base plate and/or the objective holder in a connection region, at least one free end of the connecting pin being radially widened so that the base plate and the objective holder are pressed against each other.

2. The camera module as recited in claim 1, wherein the connecting pin is radially widened by a forming die using a radially acting deformation force.

3. The camera module as recited in claim 1, wherein the free end of the connecting pin has a conical outer contour.

4. The camera module as recited claim 1, wherein an insertion element is situated in the widened free end of the connecting pin.

5. The camera module as recited in claim 1, wherein the free end of the connecting pin has a toroidal outer contour, which rests on the base plate at the front end.

6. The camera module as recited in claim 1, wherein the free end of the connecting pin has a plurality of groove-shaped indentations.

7. A camera system, comprising:
    a camera module, including:
        a base plate on which an image sensor is situated,
        an objective holder in which an objective of the camera module is accommodated, and
        a connecting pin which extends through the base plate and/or the objective holder in a connection region;
    wherein at least one free end of the connecting pin is radially widened so that the base plate and the objective holder are pressed against each other.

* * * * *